United States Patent
Chen

(10) Patent No.: US 8,388,129 B2
(45) Date of Patent: Mar. 5, 2013

(54) FLEXIBLE NOSE SUPPORT AND EYEGLASSES HAVING THE SAME

(76) Inventor: Jimmy Chen, Taipei (TW)

(*) Notice: Subject to any disclaimer, the term of this patent is extended or adjusted under 35 U.S.C. 154(b) by 68 days.

(21) Appl. No.: 13/026,348

(22) Filed: Feb. 14, 2011

(65) Prior Publication Data

US 2012/0206690 A1 Aug. 16, 2012

(51) Int. Cl.
*G02C 5/12* (2006.01)
(52) U.S. Cl. .......................... 351/136; 351/137
(58) Field of Classification Search .............. 351/41, 351/44, 67–81, 124–139
See application file for complete search history.

(56) References Cited

U.S. PATENT DOCUMENTS

| 7,425,065 B2* | 9/2008 | Wang | 351/137 |
| 2011/0109871 A1* | 5/2011 | Chiou | 351/57 |

* cited by examiner

*Primary Examiner* — Huy K Mai
(74) *Attorney, Agent, or Firm* — Rosenberg, Klein & Lee

(57) ABSTRACT

A flexible nose support and eyeglasses thereof are disclosed. The eyeglasses include an eyeglass body and the flexible nose support. The eyeglass body has a bridge portion, and the flexible nose support has a mounting pad, at least one engaging member, and two flexible support arms, where all are integrally formed in one piece. By mounting the flexible nose support upwardly onto the bridge portion, the flexible nose support is secured to the eyeglasses.

16 Claims, 9 Drawing Sheets

FLEXIBLE NOSE SUPPORT AND EYEGLASSES HAVING THE SAME

BACKGROUND OF THE INVENTION

1. Field of the Invention

The instant disclosure relates to a vision correction device and a nose support thereof; more particularly, to a flexible nose support and eyeglasses having the same.

2. Description of Related Art

As one of the primitive senses of human beings, sight (or vision) plays an important role in the daily life. However, people often suffer from the loss of vision due to aging or other inherent/acquired reasons. Optical correction device such as eyeglasses were therefore developed to alleviate certain types of impaired vision. By utilizing optical lenses of different nature, various types of eyeglasses are available to correct different types of eyesight deficiency or provide eye-protection. For example, optical glasses (i.e. short-sighted glasses, presbyopia glasses, astigmatism glasses, etc.), sunglasses, sports glasses (e.g. sandstorm glasses, UV safety glasses, etc.), goggles, ski glasses, safety glasses (e.g. welding glasses, IR laser glasses), ornamental eyeglasses, etc., each serves its specific purpose for eyesight enhancement/ protection. Classifying by the material, the eyeglasses may employ glass lenses, plastic lenses, acrylic lenses, etc. Based on frame types, there are rimmed glasses, semi-rimless glasses, rimless glasses, etc. The structural design of the nose pads is essential to the wearing comfort of a user. While the structural design of nose pads may subjectively affect its aesthetics, the structural arrangement will directly affect the wearing comfort for a user. In particular, the nose support portion of the eyeglasses plays a key role in the overall comfort level.

Conventional eyeglasses often include nose pads that fit over the bridge portion for providing facial support. FIG. 1 shows conventional eyeglasses 1' having a pair of rigidly-shaped nose pads 11. Screws (not shown) are often used on the frame unit 10' for fixing the nose pads 11' thereon. According to the shape of the nose, the nose pads 11' can be adjusted correspondingly to provide wearing comfort and stability. However, the position of the threaded holes is often a tedious factor that requires careful attention in eyeglasses designed, which makes the conventional frame structure more complex and less cost-effective. Also, the angle between the nose pads 11' is fixed, and the nose pad 11' is attached to the eyeglasses 1' perpendicularly. The disadvantages of this conventional design is that when the nose pads 11' and the eyeglasses 1' are not securely fixed to each other, the nose pads 11' can fell off and be lost. In addition, the nose pads 11' may not be soft enough to provide comfort to the nose.

Another common eyeglasses design utilizes integrally formed nose piece on the frame. Being made of the same rigid material as the frame unit, the hard nose piece may cause discomfort to a user. Moreover, because the nose piece is made of rigid material with limited flexibility, little to none adjustment can be made to enable better fitment to the nose.

To address the above issues, the inventor conducted related study and research and proposes the following solution as described by the instant disclosure.

SUMMARY OF THE INVENTION

An embodiment of the instant disclosure provides a flexible nose support, which includes a mounting pad and two flexible support arms. The mounting pad comprises a front portion, a rear portion, and an intermediate portion connected there-between. The flexible arm includes a fixed end and a free end. The fixed end is connected to the rear portion, wherein the flexible arm extends downward off the fixed end at an angle to form the free end. The mounting pad and the flexible support arms are integrally formed in one piece.

Another embodiment of the instant disclosure provides a pair of eyeglasses, which comprises an eyeglass body and the aforementioned flexible nose support. The eyeglass body includes an frame unit, which has a bridge portion for mounting the flexible nose support.

Still, an alternative embodiment provides a pair of eyeglasses, which comprises the eyeglass body and the aforementioned flexible nose support. The eyeglass body has at least one lens portion, which has the bridge portion for mounting the flexible nose support.

Based on the above, the instant disclosure includes the following advantages. Namely, the flexible nose support is integrally formed in one piece, thus is more structurally stable. The orientation of the flexible nose support is less likely to offset due to vibration, thus enhancing user-friendliness. Next, the flexible support arms of the flexible nose support allow adjustment relative to the bridge of the nose. Therefore, the flexible support arms are held closely but gently to the nose, in such a way to provide better comfort, fit, and stability.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF PREFERRED EMBODIMENTS

Figure 2:
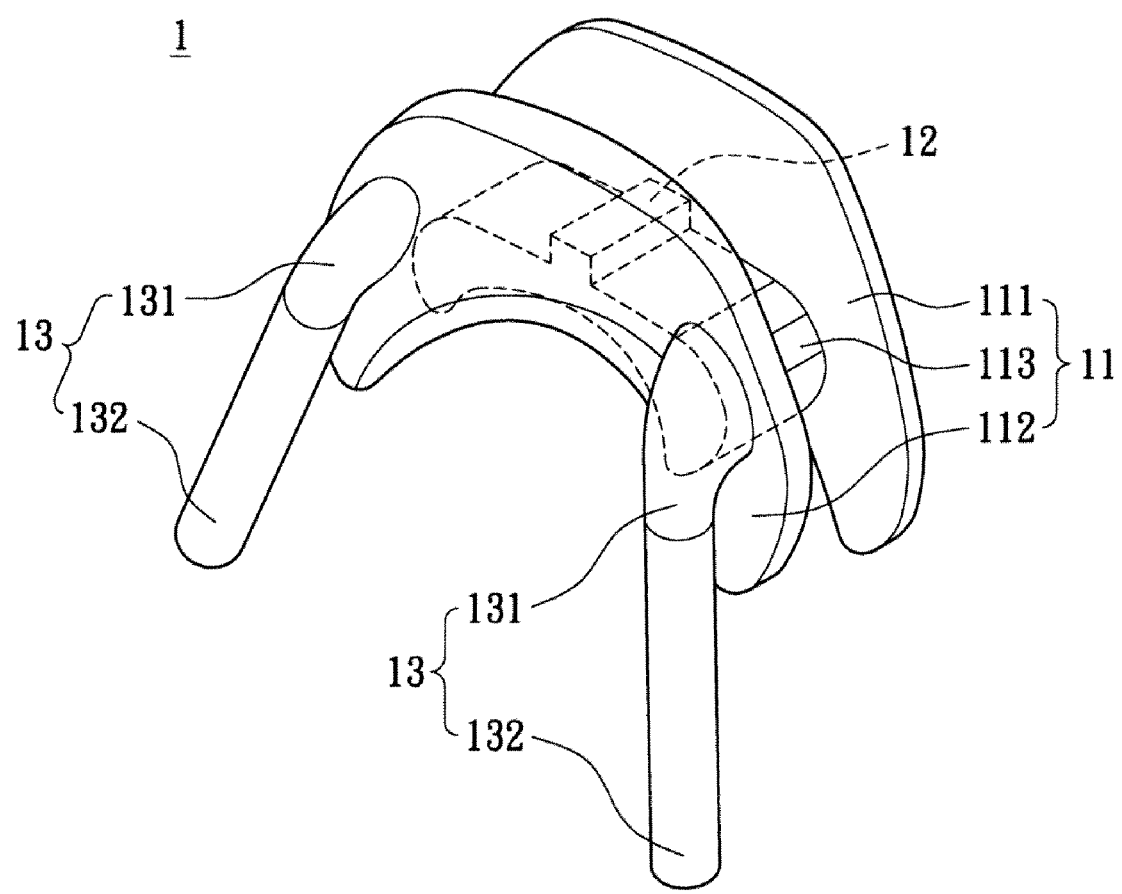
FIG. 2 shows a perspective view of a flexible nose support of the instant disclosure.
Figure 3:
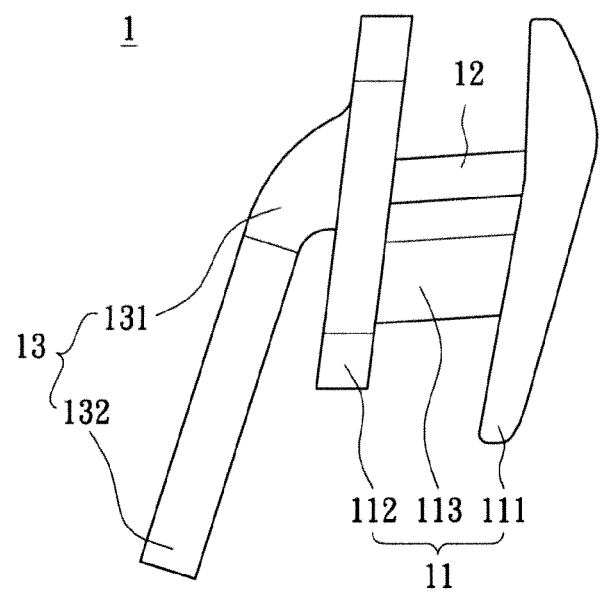
FIG. 3 shows a side view of the flexible nose support of the instant disclosure.
Figure 4:
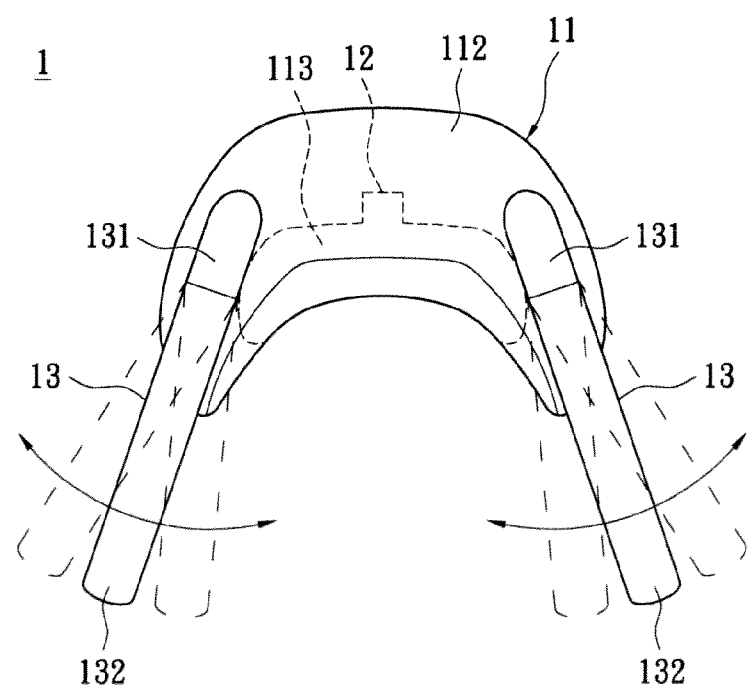
FIG. 4 shows a perspective view of the flexible nose support under adjustment for the instant disclosure.

Please refer to FIGS. 2 to 4, a flexible nose support 1 for mounting to eyeglasses is provided by the instant disclosure.

The flexible nose support 1 can include a mounting pad 11, at least one engaging member 12, and two flexible support arms 13. All above parts are integrally formed in one piece. The mounting pad 11 can have a front portion 111, a rear portion 112, and an intermediate portion 113 connected there-between. The mounting pad 11 can be mounted to the corresponding eyeglasses, thereby securing the flexible nose support 1 thereon. Also, when wearing the glasses, the flexible nose support 1 is held over the bridge of the nose to support the weight of the glasses.

The flexible arm 13 comprises a fixed end 131 and a free end 132. The fixed end 131 is connected to the rear portion 112, wherein the flexible arm 13 extends downward off the fixed end 131 at an angle to form the free end 132.

Please refer back to FIGS. 2 to 4, with further details given below. FIG. 2 shows a perspective view of the flexible nose support 1 for the instant disclosure, while FIG. 3 shows a side view thereof, and FIG. 4 shows the adjustment thereof. As illustrated in FIGS. 2 and 4, the intermediate portion 113 can be connected in between the bottom edges of the front portion 111 and the rear portion 112, wherein the intermediate portion 113 is curved in resembling a ⊓ shape. Notably, because of the viewing angle, FIG. 3 does not illustrate the aforementioned traits of the intermediate portion 113. However, FIGS. 2 and 4 clearly show the intermediate portion 113 being connected to the bottom edges of the front and rear portion 111 and 112. The intermediate portion 113 can further have a protruded engaging member 12. For the instant embodiment, the flexible nose support 1 has one engaging member 12, but can also have two or more. The engaging member 12 can be integrally formed with the mounting pad 11 and flexible support arms 13 in one piece.

The flexible nose support 1 is produced by injection molding of soft plastic material. The soft plastic material can be fed into the injection molding machine, wherein the mounting pad 11, the engaging member 12, and the flexible support arms 13 are integrally formed in one piece. The soft plastic material can be selected from silicone, polybutylene terephthalate (PBT), polypropylene (PP), nylon, or styrene butadiene copolymer (SBC), but is not limited thereto. For the instant embodiment, the flexible nose support 1 is made of SBC.

For the instant embodiment, as shown in FIG. 2, the two flexible support arms 13 are oppositely disposed. The distance between the opposing fixed ends 131 is less than the distance between the opposing free ends 132. In use, the flexible support arms 13, which extend off the rear portion 112 of the mounting pad 11, are held on the nose of the wearer. In other words, the flexible support arms 13 provide anchoring for the nose, unlike screwing the nose pads 11' onto the eyeglasses 1' of the prior art. As a result, the thickness of the flexible support arms 13 is reduced, thus enhancing the gentleness and comfort level in wearing the eyeglasses.

Furthermore, the angle between the flexible support arms 13 of the flexible nose support 1, the angle between the flexible arm 13 and the mounting pad 11, and the curvature of the flexible arm 13 itself, can all be self-adjusted according to the nose size. Having the above characteristics, the flexible support arms 13 can fit securely over the nose with the advantages of better comfort level, exact fit, better stability, etc. Asides from providing comfort, the soft flexible support arms 13 can absorb external impact to better protect the nose from receiving injury.

As described before, the flexible nose support 1 for the instant embodiment is made of SBC, which is also called K-Resin. K-Resin is referred hereinafter. As a family of clear resins, the K-Resin has the following advantages over other clear polymers. Namely, the substance exhibits glass-like clarity, shininess, toughness, impact resistance, and breakage resistance. Secondly, the K-Resin can be mixed with the general purpose polystyrene (GPPS) and high impact polystyrene (HIPS). The addition of K-Resin can adjust the stiffness and toughness quality of the polystyrene (PS) products for upgrades. Thirdly, the K-Resin can be safely used, wherein the K-Resin meets the specifications of United States FDA Regulation 21 CFR 177.1640 and EEC (European Economic Community) Directive 90/128/EEC. In addition, the K-Resin is biocompatible in accordance to ISO 10993 standards and USP (US Pharmacopoeia) Class VI as being non-toxic. Fourthly, the K-Resin is recyclable. For example, the production wastes can be recycled for reprocessing without adverse effects, or be used to reproduce impact-resistance agent of polystyrene. The other attributes include puncture resistance, capable of being printed, high shrinkage rate, and excellent permeability of water and gas (oxygen or carbon dioxide). Also, the K-Resin can be sterilized by using high frequency radiations (e.g. gamma radiation, ultraviolet radiation, or electron beam) or ethylene oxide gas. For injection molding, the K-Resin has high output rates, short cycle time for extrusion and thermoforming, and excellent properties in thermoforming in providing high yield. The K-Resin is also economically attractive by having low density, which helps to reduce cost. Asides from mixing with GPPS and HIPS, the K-Resin can also blend with polymers such as ABS (acrylonitrile butadiene styrene), SAN (styrene acrylonitrile), SMMA (styrene methyl methacrylate), PETG (polyethylene terephtalate glycol), PP (polypropylene), and PC (polycarbonate), thus having tremendous market value in terms of changing the physical properties of the mixture.

In particular, the flexible nose support 1 of the instant disclosure is made from KK38-Resin of the K-Resin family manufactured by Chevron Phillips Chemical Company LLC. The KK38-Resin has the following physical and chemical properties. First, the KK38-Resin injection molded product has glass-like clarity, shiny surface, with excellent impact strength and fluidity, which is ideal for manufacturing precision parts. Asides from good clarity and shininess, the KK38-Resin has excellent stiffness and toughness. As a copolymer, KK38-Resin has more butadiene, which gives better flexibility in terms of toughness and is suitable for injection molding or sheet extrusion. Next, the KK38-Resin has excellent resistance to low temperature, wherein the plastic part can stay intact at a temperature down to −40° C. Furthermore, KK-38 Resin has excellent light permissibility of up to 89% and passes the impact test with no break. In addition, the KK-38 Resin has low processing requirement. Namely, the KK-38 Resin is non-corrosive, does not require pre-drying, causes minimal machine wear, and has a mild operating temperature range. Therefore, the processing treatment can be implemented with the conventional cast film machine, blow molding machine, injection molding machine, thermoforming machine, etc. Having the above properties, the K-Resin proof to be an ideal material selection for manufacturing the flexible nose support 1 of the instant disclosure.

Figure 5A:
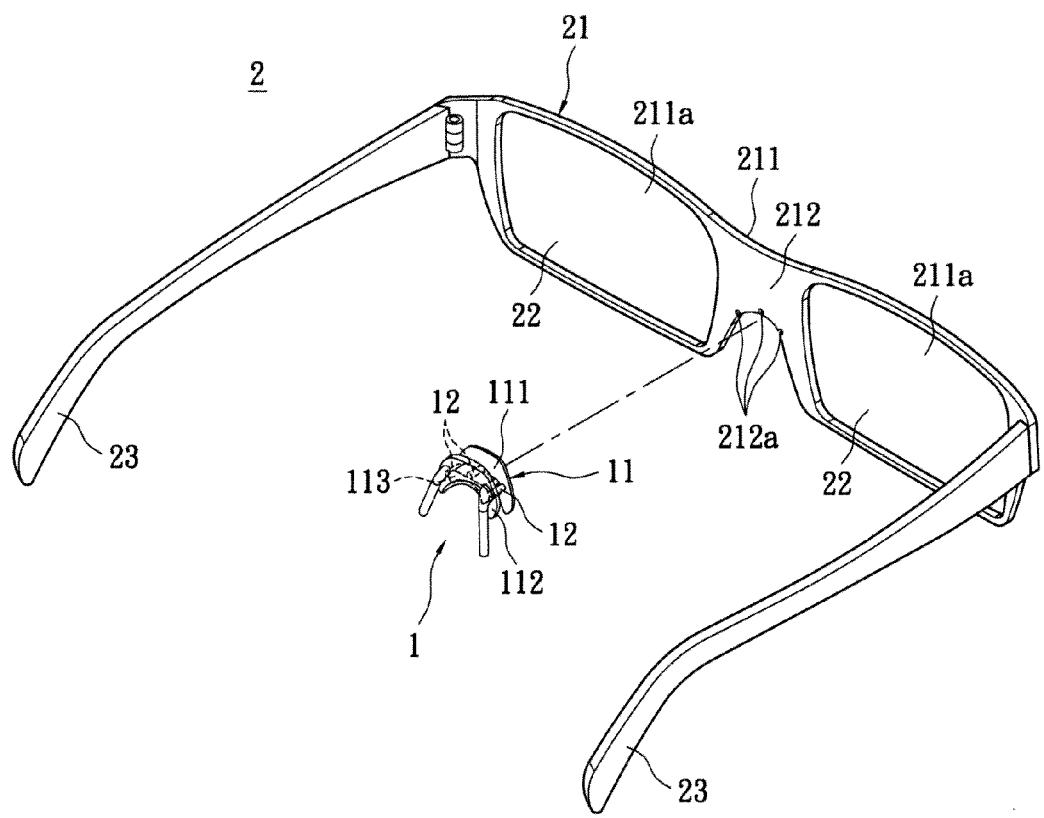
FIG. 5A shows a perspective view of mounting the flexible nose support to a pair of eyeglasses for a first embodiment of the instant disclosure.

Please refer to FIG. 5A, which shows mounting the flexible nose support 1 to a pair of eyeglasses 2 for a first embodiment of the instant disclosure. The eyeglasses 2 can have an eyeglass body 21 and the flexible nose support 1. Since the flexible nose support 1 is already described in previous discussions, therefore is not repeated herein. The eyeglass body 21 can include a frame unit 211, which has a bridge portion 212 for mounting the flexible nose support 1. At least one groove 212a is formed on the bridge portion 212 for receiving the engaging member 12 of the flexible nose support 1.

As shown in FIG. 5A, for the instant embodiment, the flexible nose support 1 is preferably provided with three engaging members 12. Nonetheless, the number of engaging member 12 is not restricted, which can be one, two, or more. Correspondingly, three grooves 212a are formed on the bridge portion 212 of the frame unit 211 with respect to the engaging members 12. The required number of grooves 212a depends on the number of engaging members 12 accordingly. Via the engaging members 12, the flexible nose support 1 is mounted upwardly onto the bridge portion 212 of the frame unit 211, thus securing the flexible nose support 1 thereon. More specifically, when the squeezable engaging members 12 are locked into the grooves 212a, the engaging members 12 are held in place by the walls of the grooves 212a, therefore preventing the flexible nose support 1 from slipping out. For the flexible nose support 1 and the eyeglasses 2, the interconnection between the engaging members 12 and the grooves 212a, along with the front portion 111, rear portion 112, and the intermediate portion 113 holding around the bridge portion 212, allow the flexible nose support 1 to be fixed securely onto the frame unit 211 of the eyeglasses 2.

Figure 1:
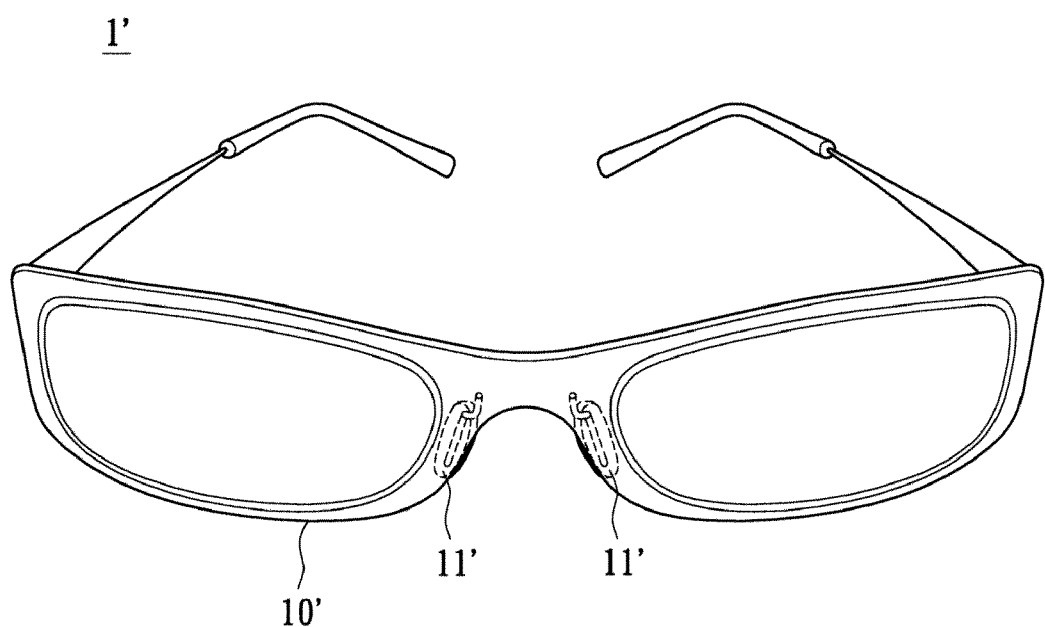
FIG. 1 shows an assembled view of a pair of eyeglasses of the prior art.

Furthermore, when the flexible nose support 1 is mounted onto the eyeglasses 2, the front portion 111, rear portion 112, and the intermediate portion 113 of the flexible nose support 1 help to reinforce the bridge portion 212 structurally, thus supporting the weight of the eyeglasses 2. The flexible nose support 1 acts to protect the eyeglass body 21 and extends the service life thereof. In addition, when mounting the flexible nose support 1 onto the eyeglasses 2, unlike the conventional eyeglasses 1' (FIG. 1), no substantial amount of fasteners are needed. The advantages include lower manufacturing cost and less assembling time, which are more economically attractive. Also, since the flexible nose support 1 can be changed out readily, the eyeglasses 2 is less likely to be damaged.

For the aforementioned frame unit 211, a left and right opening 211a are formed thereon to receive a pair of lenses 22. The eyeglasses 2 can further include two temples 23, which are disposed on opposite sides of the eyeglass body 21.

Figure 5B:
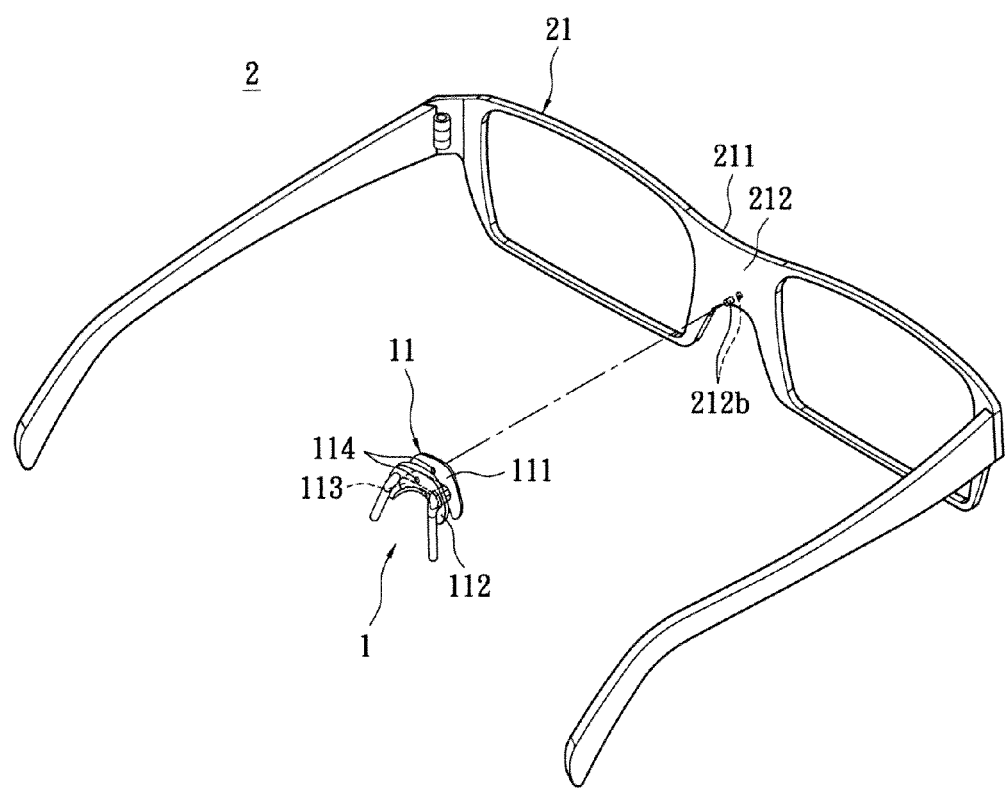
FIG. 5B shows a perspective view of mounting the flexible nose support to a pair of eyeglasses for a second embodiment of the instant disclosure.

Please refer to FIG. 5B, which shows the flexible nose support 1 mounting to the eyeglasses 2 for a second embodiment of the instant disclosure. Different from the first embodiment, the bridge portion 212 of the frame unit 211 of the instant embodiment further include at least one pivot member 212b. Correspondingly, at least one thru hole 114 is formed on the mounting pad 11 for inserting the pivot member 212b. As shown in FIG. 5B, each of the front and back side of the bridge portion 212 is provided with a pivot member 212b. However, the number of pivot members 212b is not restricted. Correspondingly, each of the front and rear portion 111 and 112 of the flexible nose support 1 has a thru hole 114 for inserting the pivot member 212b. Depending on the number of pivot members 212b, the number of thru holes 114 is formed accordingly. Therefore, thru the insertion of the pivot member 212b to the thru holes 114, in addition to the front, rear, and intermediate portion 111, 112, and 113 of holding tightly from the front, back, and under of the bridge portion 212, the flexible nose support 1 is secured onto the frame unit 211.

Figure 5C:
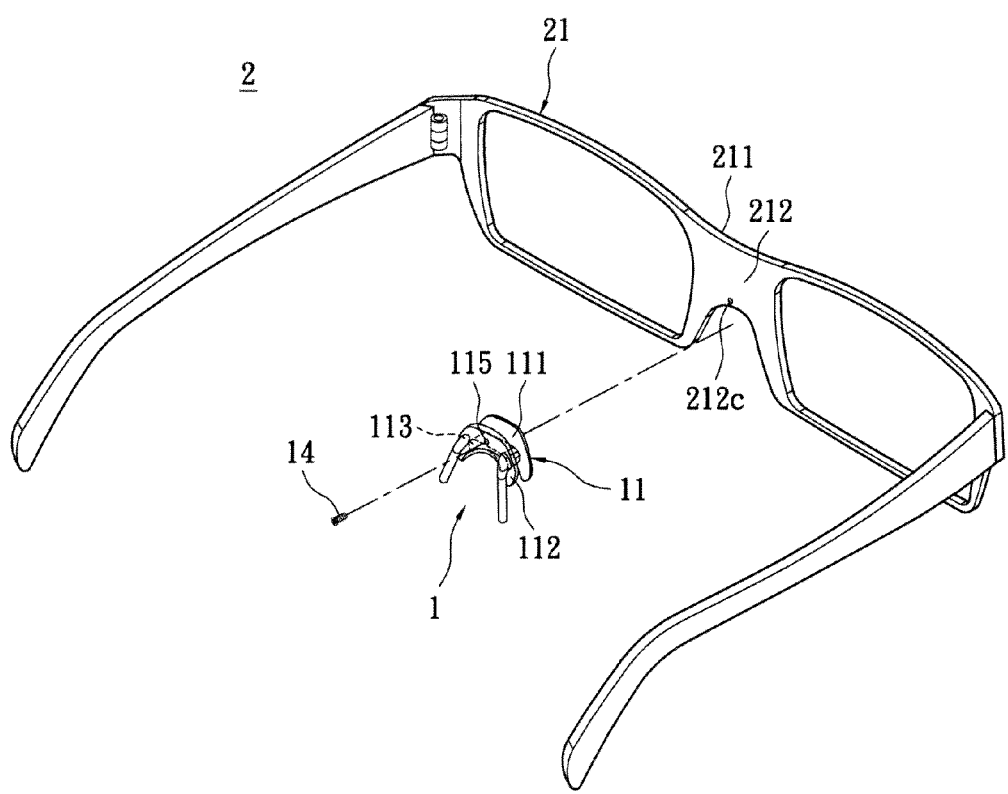
FIG. 5C shows a perspective view of mounting the flexible nose support to a pair of eyeglasses for a third embodiment of the instant disclosure.

Please refer to FIG. 5C, which shows the mounting of the flexible nose support 1 onto the eyeglasses 2 for a third embodiment of the instant disclosure. Different from the first embodiment, the bridge portion 212 of the frame unit 211 of the instant embodiment has at least one mating hole 212c. Correspondingly, either the front portion 111 or the rear portion 112 of the flexible nose support 1 can be provided with at least one threaded hole 115, or both. For the instant embodiment, as shown in FIG. 5C, one mating hole 212c is formed on the bridge portion 212. However, the number of mating hole 212c is not restricted thereto. Correspondingly, one threaded hole 115 is formed on the rear portion 112 of the flexible nose support 1. The number of threaded holes 115 is dependent of the number of mating holes 212c. Then, a screw 14 is used to interconnect the mating hole 212c with the threaded hole 115. Therefore, by interconnecting the mating hole 212c with the threaded hole 115, in addition to the front, rear, and intermediate portion 111, 112, and 113 of holding tightly from the front, back, and under of the bridge portion 212, the flexible nose support 1 is secured onto the frame unit 211.

Figure 6A:
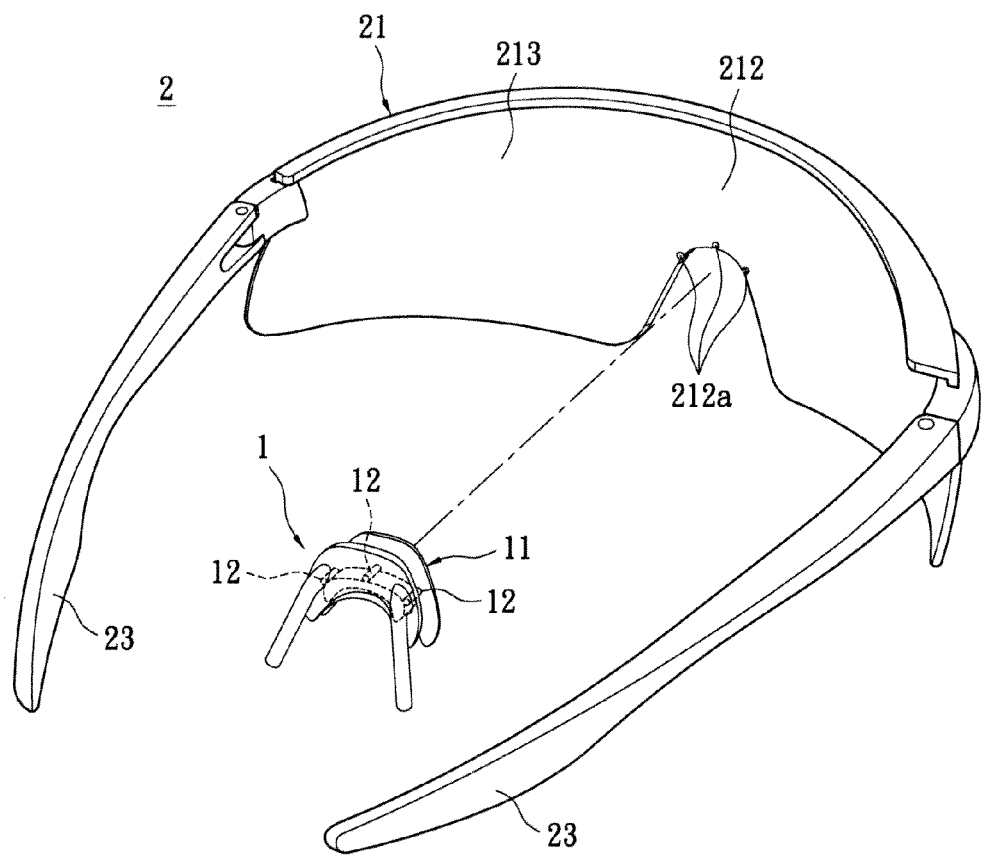
FIG. 6A shows a perspective view of mounting the flexible nose support to a pair of eyeglasses for a fourth embodiment for the instant disclosure.

Please refer to FIG. 6A, which shows the mounting of flexible nose support 1 to the eyeglasses 2 for a fourth embodiment of the instant disclosure. The eyeglasses 2 can include the eyeglass body 21 and the flexible nose support 1, wherein the flexible nose support 1 is the same structurally as in the first embodiment, therefore is not described again herein. In addition, the eyeglass body 21 can include at least one lens portion 213 having the bridge portion 212, which is for mounting the flexible nose support 1 thereon. At least one groove 212a is formed on the bridge portion 212, wherein the groove 212a corresponds to the respective engaging member 12 of the flexible nose support 1. For the instant embodiment, as shown in FIG. 6A, the flexible nose support 1 preferably has three engaging members 12. However, the number of the engaging members is not restricted thereto. For the bridge portion 212 of the lens portion 213, three grooves 212a are formed thereon in corresponding to the three engaging members 12. The number of grooves 212a depends on the number of the engaging members 12. For the instant embodiment, the flexible nose support 1 is mounted onto the eyeglasses 2 the same way as in the first embodiment, hence securing the flexible nose support 1 onto the lens portion 213. Also, the eyeglasses 2 can further include two temples 23 disposed on opposite sides of the lens portion 213.

Figure 6B:
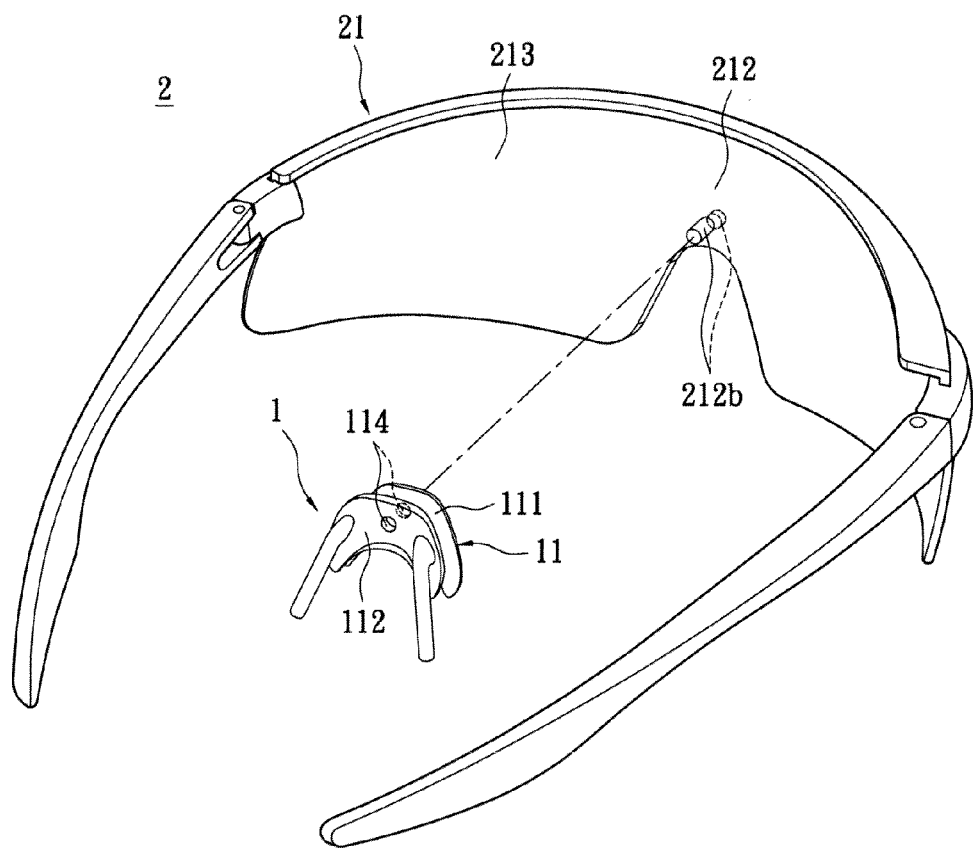
FIG. 6B shows a perspective view of mounting the flexible nose support to a pair of eyeglasses for a fifth embodiment for the instant disclosure.

Please refer to FIG. 6B, which shows the mounting of the flexible nose support 1 onto the eyeglasses 2 for a fifth embodiment of the instant disclosure. Different from the second embodiment, the instant embodiment provides a lens portion 213 having the bridge portion 212, wherein at least one pivot member 212b is disposed thereon. Correspondingly, at least one thru hole 114 is formed on the mounting pad 11 for inserting the respective pivot member 212b. As shown in FIG. 6B, each of the front and back side of the bridge portion 212 is provided with a pivot member 212b. However, the number of pivot members 212b is not restricted. Correspondingly, each of the front and rear portion 111 and 112 of the flexible nose support 1 has a thru hole 114 for inserting the respective pivot member 212b. Depending on the number of pivot members 212b, the number of thru holes 114 is formed accordingly. Therefore, thru the insertion of the pivot member 212b to the respective thru hole 114, the flexible nose support 1 is secured onto the lens portion 213.

Figure 6C:
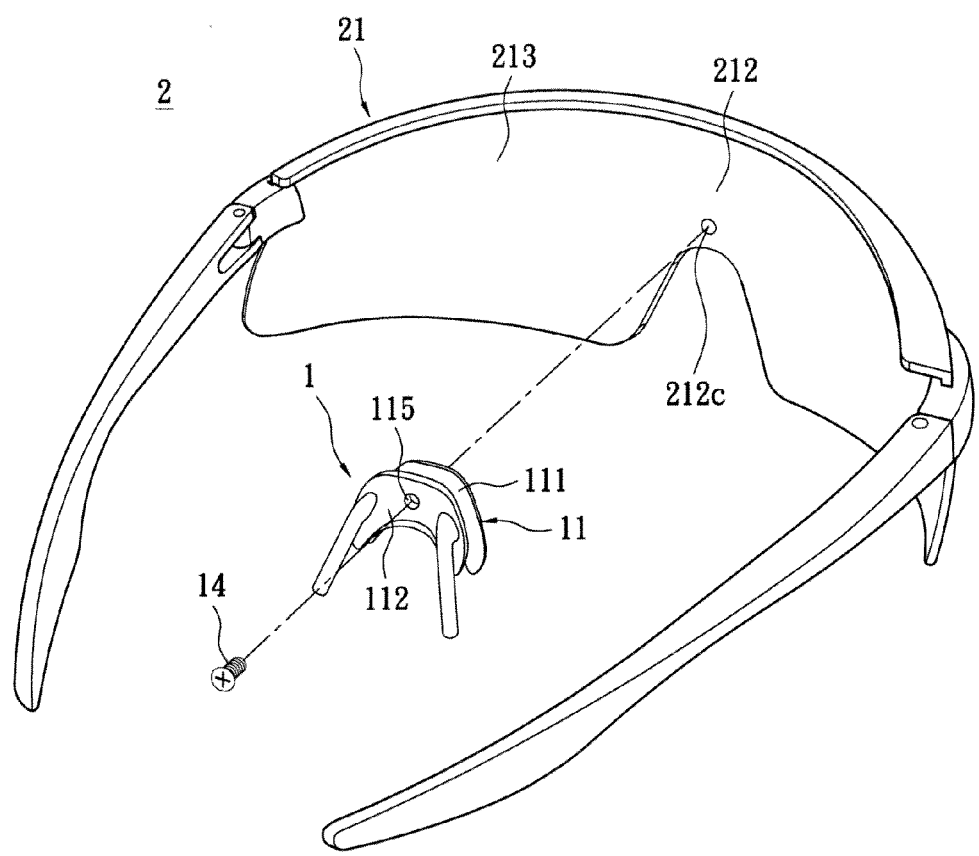
FIG. 6C shows a perspective view of mounting the flexible nose support to a pair of eyeglasses for a sixth embodiment for the instant disclosure.

Please refer to FIG. 6C, which shows the mounting of the flexible nose support 1 onto the eyeglasses 2 for a sixth embodiment of the instant disclosure. Different from the third embodiment, at least one mating hole 212c is formed on the bridge portion 212 of the lens portion 213. Correspondingly, either the front portion 111 or the rear portion 112 of the mounting pad 11 can be provided with at least one threaded hole 115, or both. For the instant embodiment, as shown in FIG. 6C, one mating hole 212c is formed on the bridge portion 212. However, the number of mating holes 212c is not restricted thereto. Correspondingly, one threaded hole 115 is formed on the rear portion 112 of the flexible nose support 1. The number of threaded holes 115 is dependent on the number of mating holes 212c. Then, a screw 14 is used to interlock the mating hole 212c with the threaded hole 115. Therefore, by interconnecting the mating hole 212c with the threaded hole 115, the flexible nose support 1 is secured onto the lens portion 213 of the eyeglasses 2.

Based on the above descriptions, the flexible nose support 1 and the eyeglasses 2 having the same present the following advantages. First, the flexible nose support 1 is integrally formed in one piece, thus enhancing the overall structural integrity. When under vibration, the flexible nose support 1 would not offset easily, thereby is more user-friendly. Secondly, being structurally flexible, the flexible support arms 13 of the flexible nose support 1 can self-adjust according to the nose of the wearer. Therefore, the flexible support arms 13 could be held closely to the nose, in providing better comfort, fit, stability, etc. Thirdly, the flexible nose support 1 is made of soft plastic grade material. In use, the flexible nose support 1 can provide better comfort and fit to the user. Fourthly, for protection, the flexible support arms 13 of the flexible nose support 1 are flexible, which act as a buffer when under external impact, thus protecting the nose from injury. Also, the flexible nose support 1 could be securely mounted onto the eyeglasses 2 without worrying about slipping off accidentally. Furthermore, when mounting the flexible nose support 1, unlike conventional glasses, no large amount of fasteners is needed. Therefore, the manufacturing cost and assembling time can be greatly reduced, which are more economically attractive. In addition, the flexible nose support 1 can be readily mounted or removed from the eyeglasses 2, thus less likely to cause damage to the eyeglasses 2.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A flexible nose support, comprising:
   a mounting pad having a front portion, a rear portion, and an intermediate portion connected in-between, wherein the intermediate portion further comprises at least one engaging member; and
   a pair of flexible support arms having a fixed end connecting the rear portion of the mounting pad and a free end extending slantingly from the fixed end, wherein the pair of flexible support arms are oppositely disposed circular poles, wherein the distance between the opposing fixed ends thereof being less than the distance between the opposing free ends,
   wherein the mounting pad, the engaging member, and the flexible support arms are of integrally formed one-piece construction of a same material.

2. The flexible nose support of claim 1, wherein the intermediate portion is connected in between the bottom edges of the front portion and the rear portion.

3. The flexible nose support of claim 1, wherein the front portion further comprises at least one thru hole, the rear portion further comprises at least one thru hole, or both the front and rear portion comprise at least one thru hole.

4. The flexible nose support of claim 1, wherein at least one threaded hole is formed on the front portion, at least one threaded hole is formed on the rear portion, or both.

5. The flexible nose support of claim 1, wherein the same material is selected form silicone, polybutylene terephthalate, polypropylene, nylon, and styrene butadiene copolymer.

6. The flexible nose support of claim 1, wherein the same material is K-38 Resin, K-38 Resin mixed with general purpose polystyrene and high impact polystyrene, K-38 Resin mixed with acrylonitrile butadiene styrene, K-38 Resin mixed with styrene acrylonitrile, K-38 Resin mixed with styrene methyl methacrylate, K-38 Resin mixed with polyethylene terephtalate glycol, K-38 Resin mixed with polypropylene, or K-38 Resin mixed with polycarbonate.

7. An eyeglasses, comprising:
   a frame unit having a bridge portion;
   a flexible nose support coupled to the bridge portion, the flexible nose support comprising:
   a mounting pad having a front portion, a rear portion, and an intermediate portion connected in-between, wherein the intermediate portion further comprises at least one engaging member, wherein at least one groove formed on the bridge portion for engaging the corresponding engaging member; and
   a pair of flexible support arms having a fixed end connecting the rear portion of the mounting pad and a free end extending slantingly from the fixed end, wherein the pair of flexible support arms are oppositely disposed circular poles, wherein the distance between the opposing fixed ends thereof being less than the distance between the opposing free ends,
   wherein the mounting pad, the engaging member, and the flexible support arms are of integrally formed one-piece construction of a same material.

8. The eyeglasses of claim 7, wherein the intermediate portion is connected in between the bottom edges of the front portion and the rear portion.

9. The eyeglasses of claim 7, wherein the bridge portion further comprises a pivot member, and wherein at least one thru hole is formed on the mounting pad for mating to the respective pivot member.

10. The eyeglasses of claim 7, wherein at least one mating hole is formed on the bridge portion, and wherein at least one threaded hole is formed on the mounting pad to be interconnected with the respective mating hole by a screw.

11. The eyeglasses of claim 7, wherein the same material is K-38 Resin, K-38 Resin mixed with general purpose polystyrene and high impact polystyrene, K-38 Resin mixed with acrylonitrile butadiene styrene, K-38 Resin mixed with styrene acrylonitrile, K-38 Resin mixed with styrene methyl methacrylate, K-38 Resin mixed with polyethylene terephtalate glycol, K-38 Resin mixed with polypropylene, or K-38 Resin mixed with polycarbonate.

12. An eyeglasses, comprising:
   an eyeglass body having at least one lens portion, the lens portion having a centrally defined bridge portion; and
   a flexible nose support coupled to the bridge portion, the flexible nose support comprising:
   a mounting pad having a front portion, a rear portion, and an intermediate portion connected in-between, wherein the intermediate portion further comprises at least one engaging member, wherein at least one groove formed on the bridge portion for engaging the corresponding engaging member; and
   a pair of flexible support arms having a fixed end connecting the rear portion of the mounting pad and a free end extending slantingly from the fixed end, wherein the pair of flexible support arms are oppositely disposed circular poles, wherein the distance between the opposing fixed ends thereof being less than the distance between the opposing free ends, wherein the mounting pad, the engaging member and the flexible support arms are of integrally formed one-piece construction of a same material.

13. The eyeglasses of claim 12, wherein the intermediate portion is connected in between the bottom edges of the front portion and the rear portion.

14. The eyeglasses of claim 12, wherein the bridge portion further comprises a pivot member, and wherein at least one thru hole is formed on the mounting pad for mating to the respective pivot member.

15. The eyeglasses of claim 12, wherein at least one mating hole is formed on the bridge portion, and wherein at least one threaded hole is formed on the mounting pad to be interconnected with the respective mating hole by a screw.

16. The eyeglasses of claim 12, wherein the same material is K-38 Resin, K-38 Resin mixed with general purpose polystyrene and high impact polystyrene, K-38 Resin mixed with acrylonitrile butadiene styrene, K-38 Resin mixed with styrene acrylonitrile, K-38 Resin mixed with styrene methyl methacrylate, K-38 Resin mixed with polyethylene terephtalate glycol, K-38 Resin mixed with polypropylene, or K-38 Resin mixed with polycarbonate.

* * * * *